United States Patent
Heberlein et al.

(10) Patent No.: US 9,541,763 B1
(45) Date of Patent: Jan. 10, 2017

(54) ACTIVE HUD ALIGNMENT

(71) Applicants: Ronald E. Heberlein, Wilsonville, OR (US); Byron B. Roethler, West Linn, OR (US); Lincoln J. Burns, Tigard, OR (US)

(72) Inventors: Ronald E. Heberlein, Wilsonville, OR (US); Byron B. Roethler, West Linn, OR (US); Lincoln J. Burns, Tigard, OR (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 14/812,508

(22) Filed: Jul. 29, 2015

(51) Int. Cl.
*G01C 21/00* (2006.01)
*G02B 27/01* (2006.01)
*G01C 23/00* (2006.01)

(52) U.S. Cl.
CPC ........... *G02B 27/0179* (2013.01); *G01C 23/00* (2013.01); *G02B 27/01* (2013.01); *G02B 2027/014* (2013.01)

(58) Field of Classification Search
CPC .............. G02B 2027/014; G02B 27/01; G02B 27/0179; G01C 23/00
USPC ............................ 340/980; 359/630; 345/7, 8
See application file for complete search history.

(56) References Cited

U.S. PATENT DOCUMENTS

| | | | | |
|---|---|---|---|---|
| 4,847,603 A * | 7/1989 | Blanchard | ............... | G02B 27/01 340/980 |
| 6,161,062 A * | 12/2000 | Sicre | .......................... | G01S 3/48 340/974 |
| 7,000,469 B2 * | 2/2006 | Foxlin | ................... | A61B 5/1113 73/488 |
| 7,605,774 B1 * | 10/2009 | Brandt | ................... | G02B 27/01 340/972 |
| 8,089,568 B1 * | 1/2012 | Brown | ............... | G02B 27/0172 349/11 |
| 8,249,806 B1 * | 8/2012 | McCusker | ........... | G01C 23/005 340/972 |
| 8,416,151 B2 * | 4/2013 | Poussin | .................. | G02B 27/01 345/7 |
| 8,875,568 B2 * | 11/2014 | Argentieri | ............. | G01P 13/025 73/170.02 |
| 2009/0112349 A1 * | 4/2009 | Cobb | .................... | B64F 5/0009 700/114 |

(Continued)

*Primary Examiner* — Steven Lim
*Assistant Examiner* — Kam Ma
(74) *Attorney, Agent, or Firm* — Donna P. Suchy; Daniel M. Barbieri

(57) ABSTRACT

An active HUD boresight alignment system for correcting a boresight of a HUD in an aircraft relative to an aircraft boresight is described. The system has an aircraft IRU, a HUD angular orientation detector and a detector. The aircraft IRU is rigidly coupled with the aircraft and configured to define an aircraft boresight indicative of a three axis angular orientation of the aircraft. The HUD angular orientation detector is rigidly arranged relative to at least one component of the HUD in the aircraft, and configured to determine a HUD boresight indicative of a three axis angular orientation of the HUD. The processor is coupled with the aircraft IRU and the HUD angular orientation detector and configured to determine a boresight angular offset of the HUD boresight to the aircraft boresight for at least one axis of the three axis angular orientation, and to correct for the boresight angular offset based on the determined boresight angular offset.

20 Claims, 6 Drawing Sheets

(56) References Cited

U.S. PATENT DOCUMENTS

| | | | |
|---|---|---|---|
| 2009/0278765 A1* | 11/2009 | Stringfellow | G02B 27/01 345/7 |
| 2010/0060730 A1* | 3/2010 | Poussin | G02B 27/01 348/115 |
| 2012/0035789 A1* | 2/2012 | He | G01C 23/005 701/16 |
| 2014/0293235 A1* | 10/2014 | Azuma | G03B 21/147 353/31 |
| 2015/0002375 A1* | 1/2015 | Williams | G02B 27/0189 345/8 |
| 2015/0092083 A1* | 4/2015 | Lam | G02B 27/017 348/234 |
| 2015/0241221 A1* | 8/2015 | Colby | G01C 23/00 701/431 |
| 2015/0317838 A1* | 11/2015 | Foxlin | G02B 27/06 345/633 |
| 2015/0329217 A1* | 11/2015 | Kirk | B64D 45/00 701/301 |
| 2016/0031052 A1* | 2/2016 | Nisperos | G02B 27/0149 29/407.05 |
| 2016/0041386 A1* | 2/2016 | Rodriguez Moreno | G02B 27/0101 345/7 |

* cited by examiner

ACTIVE HUD ALIGNMENT

BACKGROUND

The inventive concepts disclosed herein relate generally to the field of alignment of a heads up display (HUD) in an aircraft.

A HUD may be used by an operator in an aircraft to allow the operator to have a view of the outside world with superimposed information, such as symbols indicating nose direction of the aircraft, altitude, and touch down zone location where the aircraft is intended to land. It is important that the HUD be sufficiently aligned with the aircraft's three angular components, yaw, pitch, and roll, so that the superimposed information, such as the touch down zone location, is displayed in an accurate location on the HUD. Such alignment is called boresighting. A typical requirement for HUD accuracy is 3 mRad with respect to the outside world.

The alignment of the HUD is affected by the aircraft boresight itself, HUD hardpoint installation accuracy, HUD electronic boresighting, rigidity of the aircraft structure, and the location of an inertial reference unit (IRU) attached to the aircraft. The aircraft boresight itself is defined by the IRU attached to the aircraft, where the IRU provides the aircraft's three angular components, yaw, pitch, and roll.

Typical HUD hardpoint installation is performed using a target board and alignment tool while the aircraft is on the ground. The alignment tool is arranged in the aircraft cockpit, where the HUD is also arranged, while the target board is located outside of the cockpit. The alignment tool is then adjusted to align with the target board. Due to the stringent HUD accuracy requirements of about 3 mRad, the hardpoint installation requires complicated tooling to characterize the hardpoint installation, and is a time consuming process that takes up manufacturing floor space and increases cost.

HUD electronic boresighting provides for deviations from the hardpoint installation for a HUD in the cockpit. The deviations are stored in a personality module, which electronically corrects for the deviations from hard point installation for a particular HUD.

Rigidity of the aircraft and the location of the aircraft IRU on the aircraft must also be taken into account when boresighting the HUD. Typically, the aircraft IRU is disposed in a location near the wings of the aircraft in the wing box. The structure of the aircraft, however, is subject to distortion during flight, which must be compensated for in order to have accurate HUD boresighting. For example, during flight the aircraft may be subject to "nose droop," where the nose of the aircraft sags downward. In this case, the boresight of the aircraft as defined by the aircraft IRU in the wing box becomes misaligned with the HUD boresight, which is in the region near the nose of the plane, which suffers from nose droop.

The HUD boresighting may have a predetermined passive nose droop compensation. Such predetermined nose droop compensation, however, corrects for nose droop for one flight condition, and may cause the HUD to become misaligned in other conditions.

SUMMARY

In one aspect, embodiments of the inventive concepts disclosed herein are directed to an active HUD boresight alignment system for correcting a boresight of a HUD in an aircraft relative to an aircraft boresight. The system has an aircraft IRU, a HUD angular orientation detector, and a detector. The aircraft IRU is rigidly coupled with the aircraft and configured to define an aircraft boresight indicative of a three axis angular orientation of the aircraft. The HUD angular orientation detector is rigidly arranged relative to at least one component of a HUD in the aircraft, and configured to determine a HUD boresight indicative of a three axis angular orientation of the HUD. The processor is coupled with the aircraft IRU and the HUD angular orientation detector. The processor is configured to determine a boresight angular offset of the HUD boresight to the aircraft boresight for at least one axis of the three axis angular orientation, and to correct for the boresight angular offset based on the determined boresight angular offset.

In a further aspect, embodiments of the inventive concepts disclosed herein are directed to an active HUD for correcting a boresight of the HUD in an aircraft relative to an aircraft boresight. The aircraft has an aircraft IRU rigidly coupled with the aircraft and configured to define an aircraft boresight indicative of a three axis angular orientation of the aircraft. The HUD includes a HUD angular orientation detector and a processor. The HUD angular orientation detector is rigidly arranged relative to at least one component of the HUD in the aircraft, and is configured to determine a HUD boresight indicative of a three axis angular orientation of the HUD. The processor is coupled with the aircraft IRU and the HUD angular orientation detector. The processor is configured to determine a boresight angular offset of the HUD boresight to the aircraft boresight for at least one axis of the three axis angular orientation, and to correct for the boresight angular offset based on the determined boresight angular offset.

In a further aspect, embodiments of the inventive concepts disclosed herein are directed to a method of correcting a boresight of an active HUD in an aircraft relative to an aircraft boresight. An aircraft IRU is rigidly coupled with the aircraft and configured to define the aircraft boresight indicative of a three axis angular orientation of the aircraft. The method includes determining a HUD boresight indicative of a three axis angular orientation of the HUD via a HUD angular orientation detector rigidly arranged relative to at least one component of the HUD in the aircraft, determining, via a processor, a boresight angular offset of the HUD boresight to the aircraft boresight for at least one axis of the three axis angular orientation, correcting, via the processor, for the boresight angular offset based on the determined boresight angular offset; and displaying an image on the HUD based on correcting for the boresight angular offset.

DETAILED DESCRIPTION

The inventors have realized that disposing a HUD angular orientation detector, which is rigidly arranged relative to a component of the HUD in the cockpit area, allows for active correction for boresight offset between the HUD and aircraft boresights.

Figure 1A:
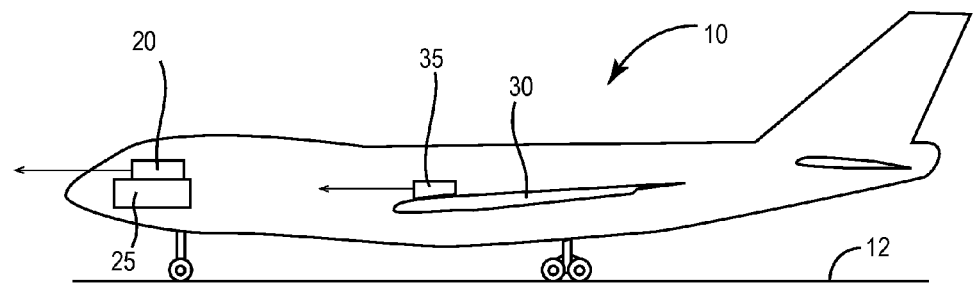
FIG. 1A is a side view of an aircraft on the ground with no nose droop.
Figure 1B:
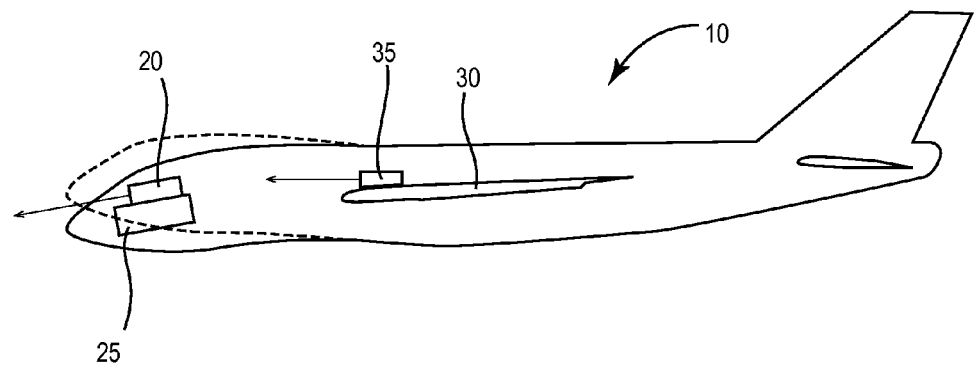
FIG. 1B is a side view of the aircraft of FIG. 1A shown in flight with nose droop.
Figure 2:
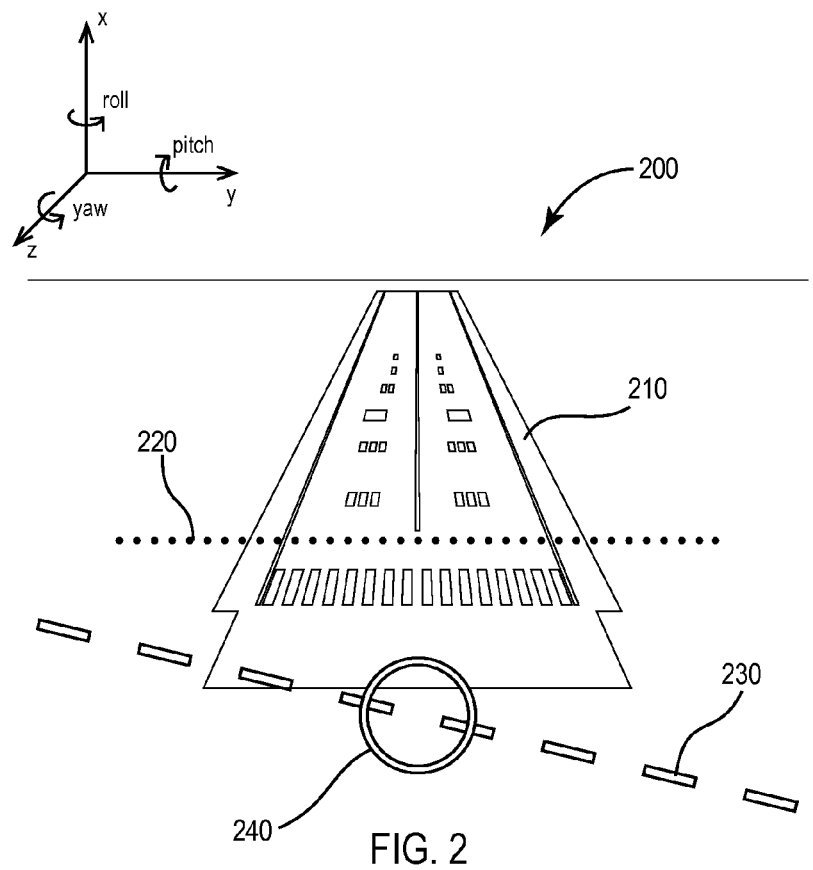
FIG. 2 is a HUD display of an aircraft intending to land on a runway, where the display has not been corrected for boresight offset.

FIGS. 1A, 1B and 2 illustrate the effects of nose droop of an aircraft in causing the aircraft boresight to become misaligned with the boresight of the HUD in the cockpit of the aircraft.

FIG. 1A illustrates an aircraft 10 on the ground 12, where the aircraft 10 has an aircraft IRU 35 rigidly attached to the wingbox 30 of the aircraft 10, and where a HUD 25 in the cockpit region of the aircraft 10 has a HUD IRU 20 rigidly arranged relative to the HUD 25. In FIG. 1, where the aircraft 10 is on the ground, the aircraft 10 is not subject to the deformation due to aircraft flight. In this case, when the HUD 25 has been subjected to some form of hardpoint installation on the ground for aligning the HUD 25 and aircraft boresights, the boresight of the HUD 25 is aligned with the boresight of the aircraft.

FIG. 1B illustrates an aircraft 10 in flight where the aircraft is subject to deformation, namely nose droop. The aircraft 10 sags due to nose droop, and the nose of the aircraft dips downward. In this case, the boresight of the aircraft 10, as defined by the aircraft IRU 35 rigidly attached to the wing box 30, remains the same. The boresight of the HUD IRU 20, however, which is rigidly arranged relative to a component of the HUD 25, deviates in a downward vertical direction due to the nose droop. Thus, the boresight of the HUD 25 becomes offset from the aircraft boresight of the aircraft 10 in a downward vertical direction due to the nose droop.

The offset in the boresight of the HUD 25 relative to the boresight of the aircraft 10 causes the information data to be displayed on a display of the HUD to be misaligned as explained with respect to FIG. 2. FIG. 2 illustrates a HUD display 200 in the case of an aircraft intending to land on a runway 210. For ease of illustration, the HUD display 200 in FIG. 2 only illustrates the runway of the view outside the aircraft 10 along with certain relevant information data symbols. In general, the HUD display 200 will display more features in the view outside the aircraft 10, and more information data symbols, including enhanced sensor video and synthetic terrain.

An actual touch down zone 220 is shown by a dotted line, where the actual touch down zone 220 is the line for which the aircraft will touch down on the runway for the projected path of the aircraft 10. The uncorrected touch down zone 230, which has not been corrected for boresight offset, is shown by a dashed line, and is misaligned due to the misalignment of the boresight of the HUD 25 relative to the boresight of the aircraft 10. As can be seen, the uncorrected touch down zone 230 is offset from the actual touch down zone 220 in the downward vertical direction which corresponds to a pitch of the aircraft. The uncorrected touch down zone 230 is further offset in a roll direction. In general, the uncorrected touch down zone 230 may be offset from the actual touch down zone in one or more of the pitch, roll, or yaw direction. Setting the x-axis as the direction of the heading of the aircraft 10, the yaw, pitch and roll parameters are shown. Roll is a rotation about the x-axis, yaw is a rotation about the z-axis, and pitch is a rotation about the y-axis as shown in FIG. 2.

The current flight path symbol 240 is also shown in FIG. 2. The current flight path symbol 240 is also vertically offset in the downward vertical direction (pitch) due to the nose droop. As will be appreciated by persons of ordinary skill in the art having the benefit of the instant disclosure, the nose droop of the aircraft 10, the offset in the boresight of the HUD 25, and the misalignment of the uncorrected touch zone 230 and the actual touchdown zone 220 have been greatly exaggerated in the FIGS. 1A-2 for illustration purposes and for ease of understanding of the inventive concepts disclosed herein. Actual amounts of nose droop, boresight offset, and misalignments may be much smaller, and may vary with aircraft load, flight phase, weather, aircraft type, and other variables.

Figure 3:
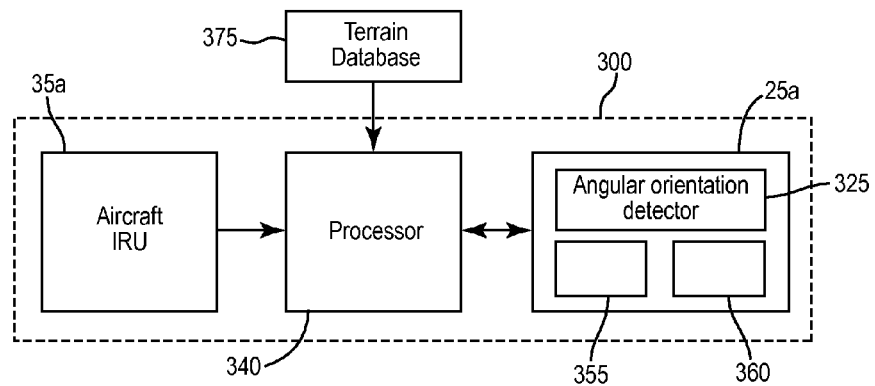
FIG. 3 is a schematic illustrating an active boresight alignment system according to an embodiment of the inventive concepts disclosed herein.
Figure 4:
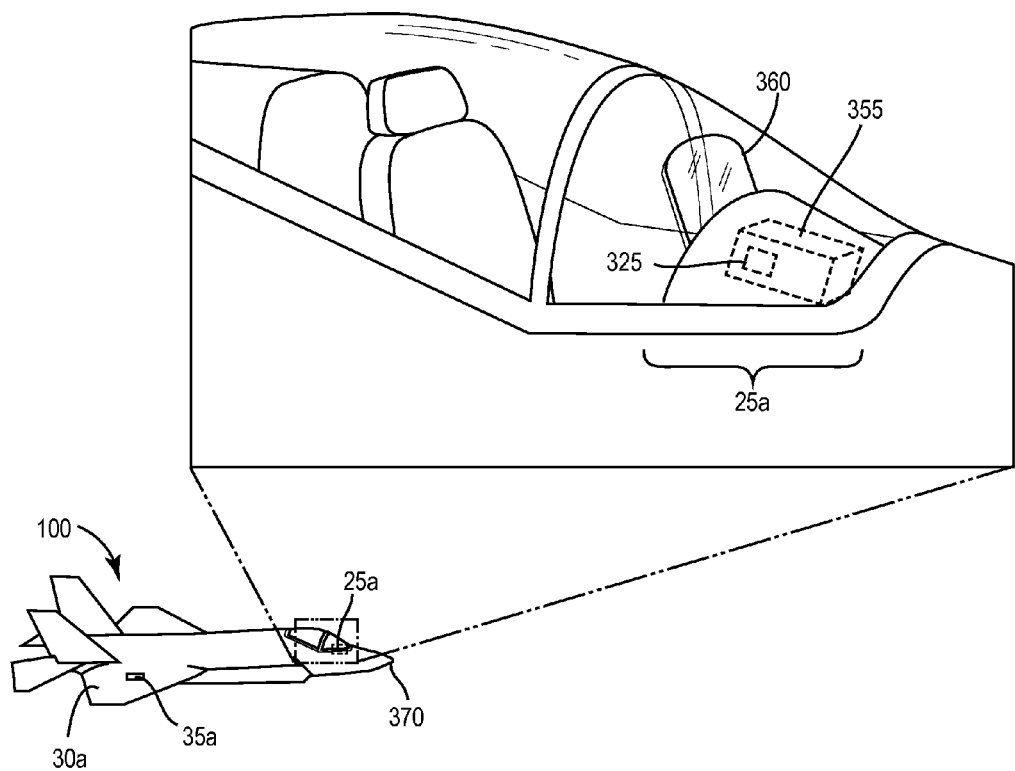
FIG. 4 is a schematic illustrating the active boresight alignment system of FIG. 3 in the context of an aircraft.

An active HUD boresight alignment system 300 according to inventive concepts disclosed herein is described with respect to FIGS. 3 and 4, where FIG. 3 illustrates an exemplary active HUD boresight alignment system 300, and FIG. 4 illustrates the boresight alignment system 300 in the context of an aircraft 100.

The active HUD boresight alignment system 300 includes an aircraft IRU 35a, a HUD angular orientation detector 325, and a processor 340. Referring to FIG. 4, the aircraft IRU 35a is rigidly attached to the aircraft 100. For example, the aircraft IRU 35a may be rigidly attached to a wingbox 30a of the aircraft 100.

The aircraft IRU 35a is configured to define an aircraft boresight having a three-axis angular orientation of the aircraft 100. The three axis orientation of the aircraft 100 may be characterized by yaw, pitch and roll parameters, for example, although other angular bases may be used.

Returning to FIGS. 3 and 4, the HUD angular orientation detector 325 is rigidly arranged relative to at least one component of a HUD 25a. The HUD 25a in FIGS. 3 and 4 exemplarily illustrates the HUD 25a to have components of a projector 355 and a combiner 360. In the case the HUD angular orientation detector 325 has a projector 355 and a combiner 360, the HUD angular orientation detector 325 is rigidly arranged relative to at least one of the projector 355 and the combiner 360. The HUD angular orientation detector 325 may be rigidly arranged relative to a component of the HUD 25a by either being directly attached to the HUD 25a, or indirectly attached to the HUD 25a via one or more intervening elements, as along as the connection between the HUD 25a and the HUD angular orientation detector 325 is rigid.

Figure 5A:
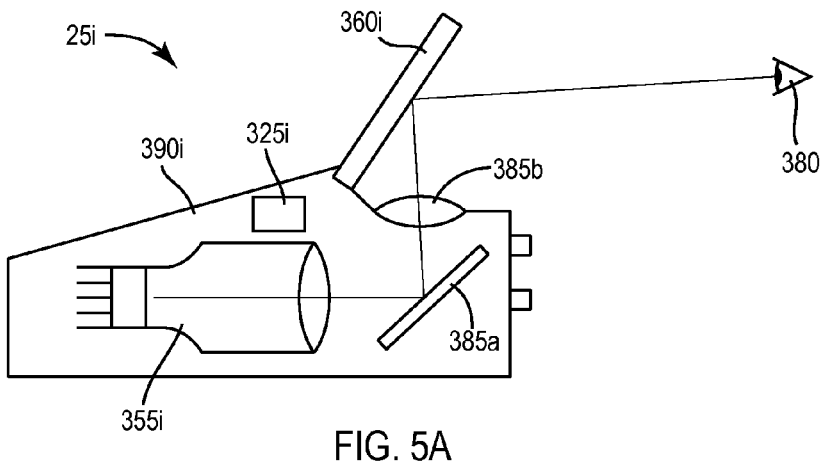
FIG. 5A illustrates a HUD having a glareshield HUD arrangement according to an embodiment of the inventive concepts disclosed herein.
Figure 5B:
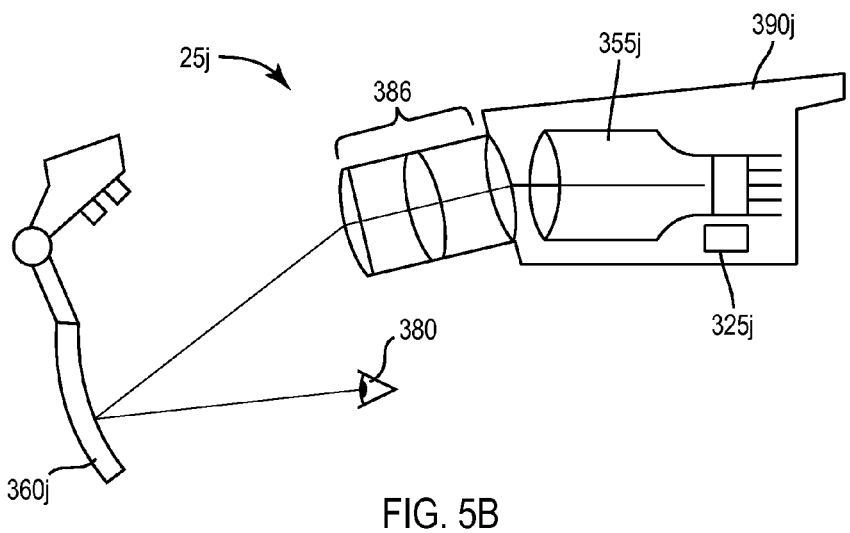
FIG. 5B illustrates a HUD having an overhead HUD arrangement according to an embodiment of the inventive concepts disclosed herein.
Figure 5C:
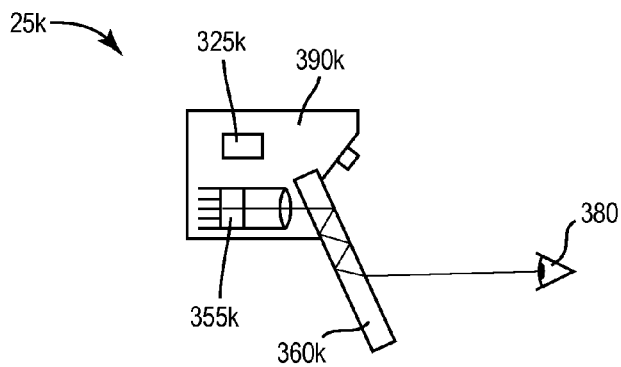
FIG. 5C illustrates a HUD having a compact HUD arrangement according to an embodiment of the inventive concepts disclosed herein.

FIGS. 5A-5C illustrate the HUD 25 including the projector 355 and the combiner 360 according to three different arrangements. FIGS. 5A, 5B and 5C refer to a glareshield HUD arrangement, an overhead HUD arrangement, and a compact HUD arrangement, respectively.

Referring to the glareshield HUD arrangement of FIG. 5A, the HUD 25i includes intermediate optics 385a and 385b, for example, to direct an image from the projector 355i to the combiner 360i, which may be viewed by a viewer 380, such as a pilot in an aircraft. Specifically, the intermediate optics may include a mirror 385a and lens 385b.

The HUD 25i includes a housing 390i for housing the projector 355i, which is rigidly attached to the housing 390i. The combiner 360i is rigidly attached to the housing 390i. The housing 390i further has the HUD angular orientation detector 325i rigidly attached thereto. Thus, the HUD angular orientation detector 325i is rigidly arranged to both the combiner 360i and the projector 355i via the housing 390i.

Referring to the overhead HUD arrangement of FIG. 5B, the projector 355j and the combiner 360j are separated. The HUD 25j includes intermediate optics 386, for example, to direct an image from the projector 355j to the combiner 360j, which may be viewed by a viewer 380, such as a pilot in an aircraft.

The HUD 25j of FIG. 5B includes a housing 390j for housing the projector 355j, which is rigidly attached to the housing 390j. The HUD angular orientation detector 325j may be rigidly attached to the housing 390j as shown in FIG. 5B. In this case the HUD angular orientation detector 325j is rigidly arranged relative to the projector 355j, but not to the combiner 360j. Alternatively, the HUD angular orientation detector 325j may be rigidly attached to the combiner 360j instead of to the projector 355j. In this case the HUD angular orientation detector 325j is rigidly arranged relative to the combiner 360j, but not to the projector 355j.

Referring to the compact HUD arrangement of FIG. 5C, the projector 355k projects an image to the combiner 360k, which may be viewed by a viewer 380, such as a pilot in an aircraft. The HUD 25k includes a housing 390k for housing the projector 355k, which is rigidly attached to the housing 390k. The combiner 360k is rigidly attached to the housing 390k.

The housing 390k further has the HUD angular orientation detector 325k rigidly attached thereto. Thus, the HUD angular orientation detector 325k is rigidly arranged relative to both the combiner 360k and the housing 390k via the housing 395k.

Referring back to FIGS. 3 and 4, the HUD angular orientation detector 325 is configured to determine a HUD boresight having a three axis angular orientation of the HUD 25a. In a similar fashion to the three axis angular orientation of the aircraft 100, the three axis angular orientation of the HUD 25a may be characterized by yaw, pitch and roll parameters, for example, although other angular bases may be used.

The HUD angular orientation detector 325 may be an IRU, for example. The HUD angular orientation detector 325 may alternatively be a sensor or collection of sensors which are configured to determine a HUD boresight. For example, the HUD angular orientation detector 325 may comprise an arrangement of position sensors. Each position sensor provides its position in an x, y, z space, and the collective positions define an angular orientation. In this regard, in order to provide a full three axis angular orientation, the arrangement of positions sensors should include at least three position sensors arranged non-collinearly.

The processor 340 is configured to determine a boresight angular offset of the HUD boresight relative to the aircraft boresight, and to correct for the boresight angular offset. The processor 340 receives the aircraft boresight data, which provides the three axis angular orientation of the aircraft 100, as measured by the aircraft IRU 35. The processor 340 also receives the HUD boresight data, which provides the three axis angular orientation of the boresight of the HUD 25, as measured by the HUD angular orientation detector 325. The processor 340 then compares the three axis angular orientation of the aircraft 100, such as the yaw, pitch, and roll parameters, to the three axis angular orientation of the HUD 25. The difference between the three axis angular orientation of the aircraft 100 and the three axis angular orientation of the boresight of the HUD 25 is the boresight angular offset. The processor 340 then corrects for the determined boresight angular offset, which may be corrected for one or more axes.

Figure 6A:
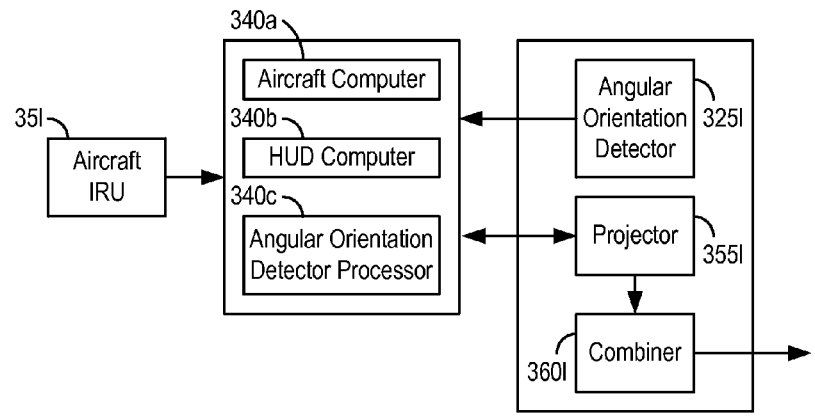
FIG. 6A illustrates an integrated arrangement where an aircraft computer, HUD computer and a HUD angular orientation detector processor are integrated with each other according to an embodiment of the inventive concepts disclosed herein.
Figure 6B:
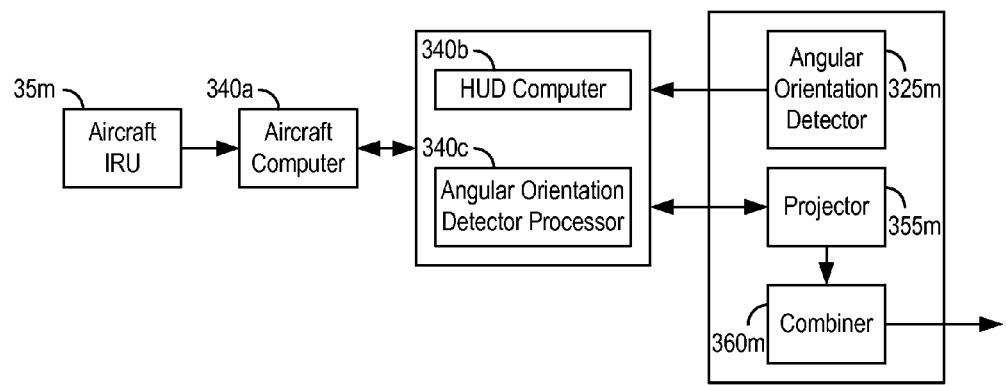
FIG. 6B illustrates an arrangement where the HUD computer and the HUD angular orientation detector processor are integrated with each other, but the aircraft computer is separate from the HUD computer and the HUD angular orientation detector processor according to an embodiment of the inventive concepts disclosed herein.
Figure 6C:
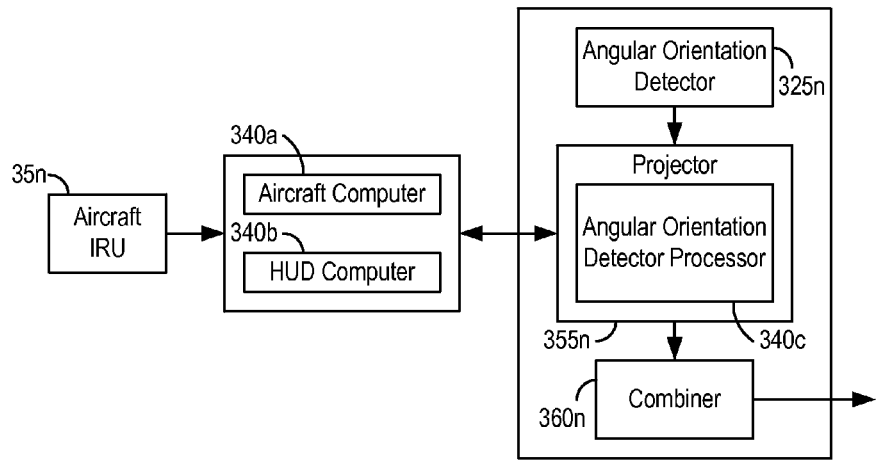
FIG. 6C illustrates an arrangement where the HUD computer and the aircraft computer are integrated with each other, but the HUD angular orientation detector processor is separate from the HUD computer and the aircraft computer according to an embodiment of the inventive concepts disclosed herein.

FIGS. 6A-6C illustrate different arrangements of the processor 340 relative to the HUD 25a and the aircraft IRU 35a, as specific embodiments of the system 300 of FIG. 3. The processor 340 may be part of one or more of an aircraft computer 340a, a HUD computer 340b or a HUD angular orientation detector processor 340c. The aircraft computer 340a may be installed in the aircraft 100, and performs functions such as driving autopilot of the aircraft 100, and receives inputs from a number of aircraft sensors. The HUD computer 340b may receive sensor input directly from aircraft sensors. As shown in FIGS. 3 and 4, the aircraft sensors may include one or more infrared (IR) sensors 370, which detect an IR image of objects outside the aircraft 100. The projector 355 may project an image onto the combiner 360 including an image detected by the image sensors 370. FIG. 6A illustrates an integrated arrangement where the aircraft computer 340a, the HUD computer 340b and the HUD angular orientation detector processor 340c are integrated with each other in a system with aircraft IRU 351, angular orientation detector 325l, projector 355l and combiner 360l. FIG. 6B illustrates an arrangement where the HUD computer 340b and the HUD angular orientation detector processor 340c are integrated with each other, but the aircraft computer 340a is separate from the HUD computer 340b and the HUD angular orientation detector processor 340c in a system with aircraft IRU 35m, angular orientation detector 325m, projector 355m and combiner 360m. FIG. 6C illustrates an arrangement where the HUD computer 340b and the aircraft computer 340a are integrated with each other, but the HUD angular orientation detector processor 340c is separate from the HUD computer 340b and the aircraft computer 340a in a system with aircraft IRU 35n, angular orientation detector 325n, projector 355n and combiner 360n. Further, the HUD angular orientation detector processor 340c and the HUD angular orientation detector 25m are integrated with each other.

Referring back to FIGS. 3 and 4, the active HUD boresight alignment system 300 may receive terrain data from a terrain data database 375, such as would be a part of a synthetic vision system (SVS). The terrain data includes information regarding the terrain which would be viewed outside the aircraft 100, such as the location and shapes of hills and mountains, for example. The projector 355 may project an image onto the combiner 360 including an image based on the received terrain data.

Figure 7:
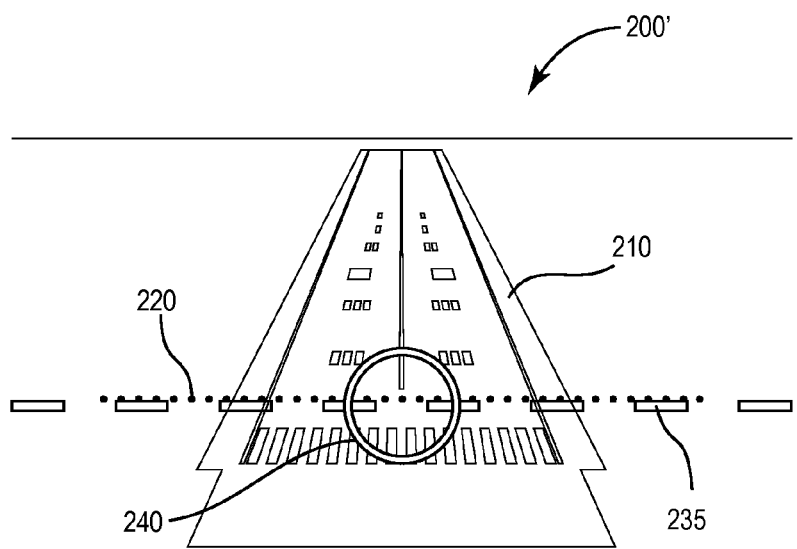
FIG. 7 is a HUD display of an aircraft intending to land on a runway, where the display has been corrected for boresight offset according to an embodiment of the inventive concepts disclosed herein.

The projector 355 projects an image onto the combiner 360 based on the corrected angular offset of the boresight of the HUD 25 relative to the boresight of the aircraft 100. FIG. 7 illustrates a HUD display 200' after correcting for offset. FIG. 7 is similar to FIG. 2, except that in FIG. 7, the image on the combiner 355, which is viewed by the user, has been corrected for offset.

FIG. 7 illustrates a HUD display 200' in the case of an aircraft intending to land on a runway 210. For ease of illustration, the HUD display 200' in FIG. 7 only illustrates the runway of the view outside the aircraft 100, along with certain relevant information data symbols. In general, the HUD display 200' will display more features in the view outside the aircraft 100, and more information data symbols.

The actual touch down zone 220 is shown by a dotted line, and the corrected touch down zone 235 is shown by a dashed line. The corrected touch down zone 235 is not offset from the actual touch down zone 220, but is collinear with the actual touch down zone 220. The current flight path symbol 240 is also shown in FIG. 7, and is not offset in the downward vertical direction (pitch) due to the nose droop or offset due to roll.

Figure 8:
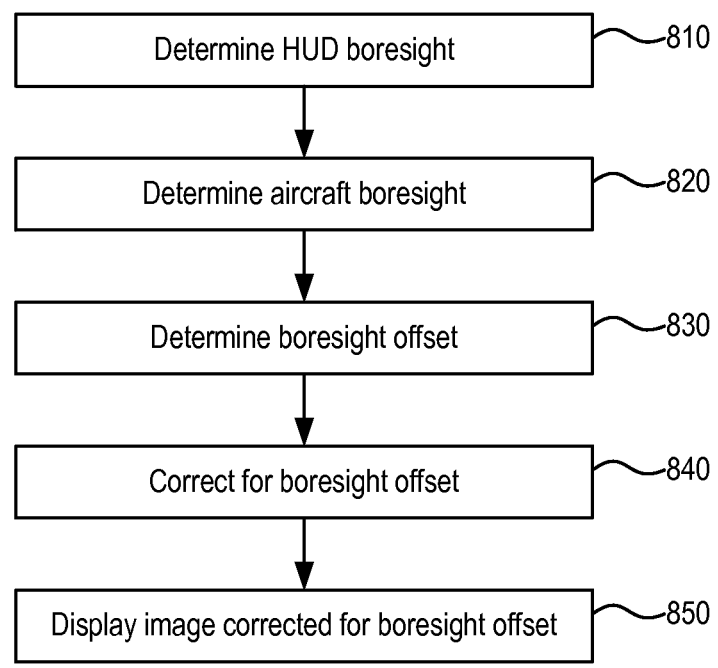
FIG. 8 is a flow chart illustrates a method of correcting the boresight of a HUD relative to an aircraft boresight, according to an embodiment of the inventive concepts disclosed herein.

FIG. 8 is a flow chart illustrates a method of correcting the boresight of a HUD relative to an aircraft boresight, according to inventive concepts disclosed herein. The method in FIG. 8 is described with respect to the system 300 illustrated in FIGS. 3 and 4, where the aircraft IRU 35a is rigidly attached to the aircraft 100 and configured to define an aircraft boresight having a three axis angular orientation of the aircraft 100. The system 300 may include any one of the HUD arrangements of FIGS. 5A-5C, or the computer and processor arrangements of FIGS. 6A-6C.

In step 810 the HUD angular orientation detector 325, which is rigidly arranged relative to at least one component of the HUD 25a in the aircraft 100, determines a HUD boresight having a three axis angular orientation of the HUD 25a. The three axis orientation of the HUD 25a may be characterized by yaw, pitch and roll parameters, although other angular bases may be used.

In step 820 the aircraft IRU 35a determines the aircraft boresight having a three axis angular orientation of the aircraft 100. The three axis orientation of the aircraft 100 may be characterized by yaw, pitch and roll parameters, although other angular bases may be used.

In step 830 the processor 340 determines a boresight angular offset of the HUD boresight relative to the aircraft boresight. The processor 340 receives the aircraft boresight data, which provides the three axis angular orientation of the aircraft 100 and the HUD boresight data, which provides the three axis angular orientation of the HUD. The processor 340 then compares the three axis angular orientation of the aircraft 100 to the three axis angular orientation of the HUD 25a. The processor 340 determines the boresight angular offset to be the difference between the three axis angular orientation of the aircraft 100 and the three axis angular orientation of the boresight of the HUD 25a. The angular offset may be for one or more of the three axes. In step 840 the processor 340 then corrects for the boresight angular offset.

In step 850 an image is displayed on the combiner 360 of the HUD 25a, where the image is based on correcting for the boresight angular offset. For example, an image such as the image shown in FIG. 7, where the image has been corrected for boresight angular offset is displayed.

While determining and correcting for the boresight offset has been described for the specific case of nose droop, the inventive concepts as described herein are not so limited. The arrangement of the HUD angular orientation detector 325 to be rigidly attached to a component of the HUD 25a allows for determining and correcting boresight offset due to deformation of the aircraft 100 in general, where the HUD 25a in the cockpit is displaced relative to the aircraft IRU 35a due to aircraft deformation. For example, the aircraft 100 may be deformed in the horizontal direction when the aircraft is turning resulting in a horizontal component boresight offset. In general, the arrangement of the HUD angular orientation detector 325 to be rigidly attached to a component of the HUD allows for determining and correcting for boresight offset regardless of the direction or magnitude of offset. Thus, the boresight offset for all phases of the aircraft flight may be determined.

Further, because the actual boresight offset is determined, the described system eliminates the need and inaccuracy of presuming a priori the particular offset to be encountered. Also, because the actual boresight offset is determined, there is no need for an aircraft personality module, which stores deviations from the hardpoint installation for a HUD in the cockpit. Further, stringent HUD hardpoint installation is not required because the actual boresight offset is determined.

The embodiments of the inventive concepts disclosed herein have been described in detail with particular reference to preferred embodiments thereof, but it will be understood by those skilled in the art that variations and modifications can be effected within the spirit and scope of the inventive concepts.

What is claimed is:

1. An active head up display (HUD) boresight alignment system, comprising:
   an aircraft inertial reference unit (IRU) rigidly coupled with the aircraft and configured to define an aircraft boresight indicative of a three axis angular orientation of the aircraft;
   a HUD angular orientation detector rigidly arranged relative to at least one component of a HUD in the aircraft, and configured to determine a HUD boresight indicative of a three axis angular orientation of the HUD during flight of the aircraft; and
   a processor coupled with the aircraft IRU and the HUD angular orientation detector, the processor configured to determine a boresight angular offset of the HUD boresight to the aircraft boresight for at least one axis of the three axis angular orientation, and to correct for the boresight angular offset based on the determined boresight angular offset.

2. The active HUD boresight alignment system of claim 1, wherein the HUD angular orientation detector is at least one of a HUD IRU and at least one position sensor.

3. The active HUD boresight alignment system of claim 1, wherein the HUD comprises:
   a combiner arranged to combine information and an image of the view outside the aircraft; and
   a projector arranged to project an image onto the combiner.

4. The active HUD boresight alignment system of claim 3, wherein the HUD angular orientation detector is rigidly attached to the combiner.

5. The active HUD boresight alignment system of claim 3, wherein the HUD angular orientation detector is rigidly attached to the projector.

6. The active HUD boresight alignment system of claim 1, wherein the three axis orientation of the aircraft and of the HUD is characterized by yaw, pitch, and roll parameters.

7. An active head up display (HUD) for correcting a boresight of the HUD in an aircraft relative to an aircraft boresight, the aircraft having an aircraft inertial reference unit (IRU) rigidly coupled with the aircraft and configured to define an aircraft boresight indicative of a three axis angular orientation of the aircraft, the HUD comprising:

a HUD angular orientation detector rigidly arranged relative to at least one component of the HUD in the aircraft, and configured to determine a HUD boresight indicative of a three axis angular orientation of the HUD during flight of the aircraft; and a processor coupled with the aircraft IRU and the HUD angular orientation detector, the processor configured to determine a boresight angular offset of the HUD boresight to the aircraft boresight for at least one axis of the three axis angular orientation, and to correct for the boresight angular offset based on the determined boresight angular offset.

8. The active HUD of claim 7, wherein the HUD angular orientation detector is at least one of a HUD IRU, or at least one position sensor.

9. The active HUD of claim 7, wherein the HUD comprises:

a combiner arranged to combine information and an image of the view outside the aircraft; and a projector arranged to project an image onto the combiner.

10. The active HUD of claim 9, wherein the HUD angular orientation detector is rigidly attached to the combiner.

11. The active HUD of claim 9, wherein the HUD angular orientation detector is rigidly attached to the projector.

12. The active HUD of claim 9, wherein the combiner and the projector are separated.

13. The active HUD of claim 7, wherein the three axis orientation of the aircraft and of the HUD is characterized by yaw, pitch and roll parameters.

14. A method of correcting a boresight of an active head up display (HUD) in an aircraft relative to an aircraft boresight, the method comprising:

determining a HUD boresight indicative of a three axis angular orientation of the HUD via a HUD angular orientation detector rigidly arranged relative to at least one component of the HUD in the aircraft during flight of the aircraft, wherein an aircraft inertial reference unit (IRU) is rigidly attached to the aircraft and configured to define the aircraft boresight indicative of a three axis angular orientation of the aircraft;

determining, via a processor, a boresight angular offset of the HUD boresight to the aircraft boresight for at least one axis of the three axis angular orientation;

correcting, via the processor, for the boresight angular offset based on the determined boresight angular offset; and displaying an image on the HUD based on correcting for the boresight angular offset.

15. The method of claim 14, wherein the HUD angular orientation detector is at least one of a HUD IRU and at least one position sensor.

16. The method of claim 14, wherein the HUD comprises:

a combiner arranged to combine information and an image of the view outside the aircraft; and a projector arranged to project an image onto the combiner.

17. The method of claim 16, wherein the HUD angular orientation detector is rigidly attached to the combiner.

18. The method of claim 16, wherein the HUD angular orientation detector is rigidly attached to the projector.

19. The method of claim 14, wherein the three axis orientation of the aircraft and of the HUD is characterized by yaw, pitch, and roll parameters.

20. The method of claim 14 wherein the HUD angular orientation detector is integrated with an inertial reference unit (IRU) attached to the aircraft.

* * * * *